United States Patent
Inamdar et al.

(10) Patent No.: US 11,909,872 B2
(45) Date of Patent: *Feb. 20, 2024

(54) SET UP AND DISTRIBUTION OF POST-QUANTUM SECURE PRE-SHARED KEYS USING EXTENDIBLE AUTHENTICATION PROTOCOL

(71) Applicant: Cisco Technology, Inc., San Jose, CA (US)

(72) Inventors: Amjad Inamdar, Karnataka (IN); Lionel Florit, Greenbrae, CA (US); Eric Voit, Bethesda, MD (US); Sujal Sheth, Gujarat (IN); Chennakesava Reddy Gaddam, Karnataka (IN)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/054,219

(22) Filed: Nov. 10, 2022

(65) Prior Publication Data
US 2023/0071333 A1    Mar. 9, 2023

Related U.S. Application Data

(63) Continuation of application No. 17/377,303, filed on Jul. 15, 2021.

(30) Foreign Application Priority Data

Apr. 27, 2021  (IN) .............................. 202141019312

(51) Int. Cl.
*H04L 9/08* (2006.01)
*H04L 9/30* (2006.01)

(52) U.S. Cl.
CPC .......... *H04L 9/0852* (2013.01); *H04L 9/0827* (2013.01); *H04L 9/0869* (2013.01); *H04L 9/304* (2013.01)

(58) Field of Classification Search
None
See application file for complete search history.

(56) References Cited

U.S. PATENT DOCUMENTS 7,246,098 B1 * 7/2007 Walmsley .......... G06Q 20/3674
713/168
2007/0192598 A1   8/2007 Troxel et al.
(Continued)

FOREIGN PATENT DOCUMENTS

| CN | 109510706 | 3/2019 |
| EP | 3562115 | 10/2019 |
| WO | 20211007235 | 1/2021 |

OTHER PUBLICATIONS

Tjhai et al., Framework to Integrate Post-Quantum Key Exchanges Into Internet Key Exchange Protocol Version 2 Internet Engineering Task Force (IETF), Jul. 9, 2019, pp. 1-21.

*Primary Examiner* — Trang T Doan
(74) *Attorney, Agent, or Firm* — Polsinelli P.C.

(57) ABSTRACT

Systems and methods are provided for quantum-resistant secure key distribution between a peer and an EAP authenticator by using an authentication server. The systems and methods include receiving requests for a COMMON-SEED and a quantum-safe public key from a peer and an EAP authenticator. The COMMON-SEED is encrypted using the quantum-safe public key of the peer and the quantum-safe public key of the EAP authenticator, and the encrypted COMMON-SEED is sent to the peer along with a request for a PPK_ID from the peer to complete authentication of the peer. The PPK_ID is received from the peer, and the encrypted COMMON-SEED and PPK_ID is sent to the EAP (Continued)

authenticator. A quantum-resistant secure channel is established between the peer and the EAP authenticator when the peer and the EAP authenticator share the same COMMON-SEED and the same PPK-ID.

20 Claims, 6 Drawing Sheets

(56) References Cited

U.S. PATENT DOCUMENTS

| | | | | |
|---|---|---|---|---|
| 2007/0226498 | A1* | 9/2007 | Walmsley | H04L 9/0662 713/168 |
| 2009/0043708 | A9* | 2/2009 | Silverbook | G06F 21/86 705/67 |
| 2016/0366587 | A1* | 12/2016 | Gross | H04L 63/0846 |
| 2019/0313246 | A1* | 10/2019 | Nix | H04W 12/30 |

* cited by examiner

SET UP AND DISTRIBUTION OF POST-QUANTUM SECURE PRE-SHARED KEYS USING EXTENDIBLE AUTHENTICATION PROTOCOL

CROSS-REFERENCE TO RELATED APPLICATIONS

This application is a Continuation of U.S. patent application Ser. No. 17/377,303, filed on Jul. 15, 2021, entitled, "SET UP AND DISTRIBUTION OF POST-QUANTUM SECURE PRE-SHARED KEYS USING EXTENDIBLE AUTHENTICATION PROTOCOL," which in turn, claims the benefit of Indian Patent Application No. 202141019312, entitled "SET UP AND DISTRIBUTION OF POST-QUANTUM SECURE PRE-SHARED KEYS USING EXTENDIBLE AUTHENTICATION PROTOCOL," filed on Apr. 27, 2021, which is incorporated herein by reference in its entirety.

FIELD

The disclosure is directed to quantum secure network communication. In particular, the disclosure relates to distribution of post-quantum secure pre-shared keys using Extensible Authentication Protocol (EAP).

BACKGROUND

There have been developing efforts around the world in building quantum computers. Cryptanalytic attacks may be accelerated by these quantum computers. In particular, Shor's algorithm is thought to undermine the foundations for deployed public-key cryptography: Rivest-Shamir-Adleman (RSA) and the discrete-logarithm problem in finite fields and elliptic curves. Long-term confidential documents such as patient healthcare records and state secrets are supposed to have guaranteed security for many years. However, when quantum computers become available, the information encrypted today using RSA or elliptic curves will then be potentially as easy to decipher as Enigma-encrypted messages are today.

A recent trend is to use both pre-shared symmetric keys at the same time as conventional public-key cryptography. New standards such as S. Fluhrer et al., Postquantum Preshared Keys for IKEv2, Internet Engineering Task Force, 2016, are emerging that use this paradigm. However, these standards assume that the pre-shared symmetric key is already in place when the key establishment session begins. That is, this approach does not address the problem of symmetric key distribution.

For public-key encryption, the currently used algorithms based on RSA and Elliptic Curve Cryptography (ECC) may be broken by quantum computers. Code-based cryptography has been studied since 1978 and has withstood attacks very well, including attacks using quantum computers. McEliece with binary Goppa codes using length n=6960, dimension k=5413, and adding t=119 errors is thought to be safe. McEliece has not been used much yet because of the computing power needed to generate keys and their sheer size (millions of bits). Rekeying McEliece is too expensive.

Symmetric systems are usually not affected by Shor's algorithm but are affected by Grover's algorithm. Under a Grover's algorithm attack, the best security a key of length n can offer is $2^{n/2}$, so AES-128 offers only $2^{64}$ post-quantum security. AES-256 is recommended but comes with the shortcomings described earlier.

Many key exchange mechanisms are in use today but are not believed to be post-quantum secure, because symmetric encryption is immune to cryptanalysis from quantum computers.

Pre-shared secret keys are harder to deploy than public keys, yet there has been a renewed interest in pre-shared secret keys because of the need to deploy post-quantum secure cryptography. There are several reasons for the difficult deployment of the pre-shared secret keys. First, managing a pool of secret keys shared between different locations is challenging. Second, when a pre-shared secret key is compromised, it is difficult to determine that a compromise has occurred, and this creates a security breach unless the key can be refreshed. Finally, it can be difficult to refresh and change the pre-shared secret keys.

QKD is a way to distribute commonly shared secrets that can be leveraged to drive the same AES key on both endpoints. However, QKD requires additional fiber and has distance limitations of 100 Km. Furthermore, it is not well-suited for a large-scale WAN deployment with numerous sites which are not likely to be well-served by fiber optic or are simply too far away.

Service provider customers can use pre-shared keys. However, it is always a challenge to maintain and distribute pre-shared keys. The disclosure provides a solution for setting up and distributing post-quantum pre-shared keys using EAP.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1:
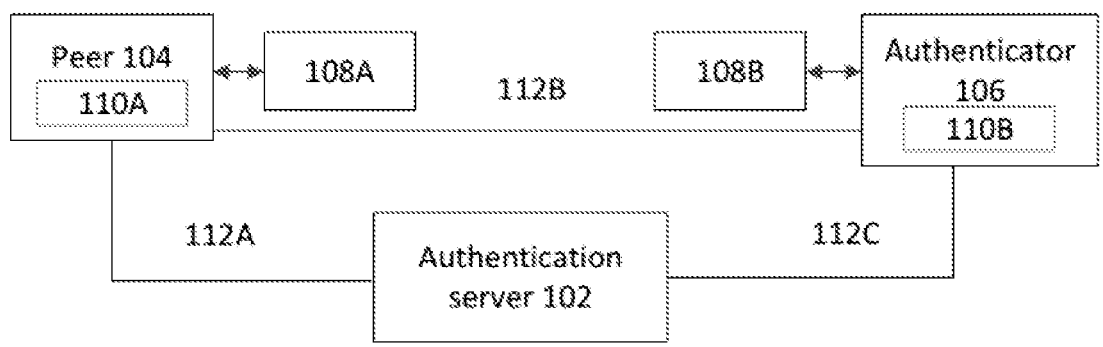
FIG. 1 is a system diagram for setting up and distribution of post-quantum pre-shared keys (PPK) using EAP, in accordance with some aspects of the disclosed technology.

The disclosure may be understood by reference to the following detailed description, taken in conjunction with the drawings as described below. It is noted that, for purposes of illustrative clarity, certain elements in various drawings may not be drawn to scale.

Acronyms

SKS: session key service

QKD: quantum key distribution

EAP: extendible authentication protocol
PPK: Post-quantum Pre-shared Key
PPK_ID: Post-quantum Pre-shared Key identity
AAA: authentication, authorization, and accounting
PPP: point to point protocol
IPsec: IP Security
IKE: Internet Key Exchange
MACsec: Media Access Control security
MKA: MACsec Key Agreement
TLS: Transport Layer Security
MSK: Master Session Key A Session Key Service (SKS), is an interface between an encrypting router and an external device (possibly 3rd party) that allows an encrypter to fetch a secret key that can be combined into session keys established by IKE or TLS or similar protocols. Each encrypter is co-located with a key provider device. These devices are synchronized so that the devices can provide identical session keys to each side of an IKE or TLS session. The SKS allows Cisco devices to be used with quantum key distribution (QKD) devices, or with other third-party systems that use conventional cryptography.

SKS offers pre-shared key generation with post-quantum security, but SKS does not solve the key distribution problem. A post-quantum secure key distribution system for an SKS has been developed to use conventional symmetric cryptography in a ratcheting manner. While this scheme is an attractive way to provide post-quantum security in products, because it does not have the range, bitrate, and physical layer limitations as the QKD has, the symmetric ratchet requires that an initial seed key be installed on each of the SKS key provider devices.

The disclosure provides a method for setting up an SKS engine or server and distributing PPK_ID using any EAP methods. The EAP methods are used to inform COMMON SEED and post-quantum pre-shared key identity (PPK-ID). Specific exchanges can be defined for each EAP method.

Overview

In one aspect, a method is provided for quantum-resistant secure key distribution between a peer and an extendible authentication protocol (EAP) authenticator by using an authentication server. The method may include receiving requests for a COMMON-SEED and a McEliece public key from a peer and an EAP authenticator by an authentication server using an EAP method, encrypting the COMMON-SEED using the McEliece public key of the peer and the McEliece public key of the EAP authenticator by the authentication server, and sending the encrypted COMMON-SEED from the authentication server to the peer along with a request for a PPK_ID from the peer using the EAP method to complete authentication of the peer. The method may also include receiving the PPK_ID from the peer using the EAP method, where the PPK_ID is from a key pair consisting of PPK_ID and PPK obtained from a first SKS server in electrical communication with the peer based upon the encrypted COMMON-SEED. The method may also include sending the encrypted COMMON-SEED and PPK_ID from the authentication server to the EAP authenticator, and establishing a quantum-resistant secure channel between the peer and the EAP authenticator, where a message of EAP success is delivered from the EAP authenticator to the peer when the peer and the EAP authenticator share the same COMMON-SEED and the same PPK-ID.

In another aspect, a system may include one or more processors and a non-transitory computer readable medium comprising instructions stored therein. The instructions, when executed by the one or more processors, may cause the processors perform operations including receiving requests for a COMMON-SEED and a McEliece public key from a peer and an EAP authenticator by an authentication server using an EAP method, encrypting the COMMON-SEED using the McEliece public key of the peer and the McEliece public key of the EAP authenticator by the authentication server, sending the encrypted COMMON-SEED from the authentication server to the peer along with a request for a PPK_ID from the peer using the EAP method to complete authentication of the peer, receiving the PPK_ID from the peer using the EAP method, wherein the PPK_ID is from a key pair consisting of PPK_ID and PPK obtained from a first SKS server in electrical communication with the peer based upon the encrypted COMMON-SEED, sending the encrypted COMMON-SEED and PPK_ID from the authentication server to the EAP authenticator, and establishing a quantum-resistant secure channel between the peer and the EAP authenticator, wherein a message of EAP success is delivered from the EAP authenticator to the peer when the peer and the EAP authenticator share the same COMMON-SEED and the same PPK-ID.

In a further raspect, a non-transitory computer readable medium may include instructions. The instructions, when executed by a computing system, may cause the computing system to perform operations comprising: receiving requests for a COMMON-SEED and a McEliece public key from a peer and an EAP authenticator by an authentication server using an EAP method, encrypting the COMMON-SEED using the McEliece public key of the peer and the McEliece public key of the EAP authenticator by the authentication server, sending the encrypted COMMON-SEED from the authentication server to the peer along with a request for a PPK_ID from the peer using the EAP method to complete authentication of the peer, receiving the PPK_ID from the peer using the EAP method, wherein the PPK_ID is from a key pair consisting of PPK_ID and PPK obtained from a first SKS server in electrical communication with the peer based upon the encrypted COMMON-SEED, sending the encrypted COMMON-SEED and PPK_ID from the authentication server to the EAP authenticator, and establishing a quantum-resistant secure channel between the peer and the EAP authenticator, wherein a message of EAP success is delivered from the EAP authenticator to the peer when the peer and the EAP authenticator share the same COMMON-SEED and the same PPK-ID.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

Detailed Description of Example Embodiments

Extensible Authentication Protocol (EAP) is an authentication framework frequently used in a wireless network and internet connections (e.g. point-to-point connections). The network may include a WiFi network, a cellular network, a satellite network, a wide area network (WAN), or a public network among others. EAP provides common functions and negotiation of authentication methods, which are called EAP methods. EAP can support multiple authentication mechanisms without having to pre-negotiate a particular one. Many different EAP methods can be specifically defined. EAP provides transport and usage of material and parameters generated by the EAP methods. EAP is defined in RFC 3748, and is updated by RFC 5247.

Many network applications like routing protocols (like OSPF, BGP, ISIS), use MPLS/RSVP, IPSec/IKE, MACSec/MKA pre-shared keys for authentication, or traffic key derivations. SKS offers pre-shared key generation with post-quantum security and this solution offers Zero-touch provisioning for setting up an SKS server and refreshes pre-shared keys at regular intervals without changing network applications using EAP protocol.

One of the benefits of the disclosed methods is that the disclosed methods do not need out-of-band communication to distribute COMMON-SEED and/or PPK_ID.

Also, for practical utilization, the COMMON-SEED can be distributed once when the peer gets authenticated the first time. However, the disclosed method extends support where the authentication server can send new COMMON-SEED to two endpoints, such that the two endpoints can re-initialize their SKS engines or SKS servers.

Also, using EAP-Re-authentication, refresh or rekey is achieved by deriving new PPK_ID on endpoints, such that the endpoints can start using or deriving new encryption keys afterward for quantum secure tunnels. As it is driven by the authentication server, refresh or rekey can be centrally controlled by the authentication server. If there is a need for refreshing COMMON-SEED or PPK_ID, the authentication server can drive refresh.

The disclosed method extends MACSec Key Agreement (MKA) protocol to carry a PPK-ID field. The MKA protocol is defined in the IEEE 802.1X-2010 standard. The MKA protocol provides required session keys and manages required encryption keys. The EAP method of informing PPK-ID can be used in any kind of secure channel establishment.

FIG. 1 is a system diagram for setting up and distribution of post-quantum pre-shared keys (PPK) using EAP, in accordance with some aspects of the disclosed technology. As shown, a network or connection 112A, such as a public network or wide area network (WAN), interconnects a peer 104 with an authentication server 102. The peer 104 is a user, client, or supplicant that wants to be authenticated. The authentication server 102 does the authentication, typically a RADIUS server, and is also referred to as an EAP Server. An authenticator 106 is a device between the peer 104 and the authentication server 102, such as a wireless access point. As shown, the peer 104 is in quantum secure communication with the EAP authenticator 106 through network or connection 112B. The authentication server 102 is also in quantum secure communication with the EAP authenticator 106 through network or connection 112C. The network or connection 112A-C may include a WiFi network, a cellular network, a satellite network, a wide area network (WAN), a public network, local area network (LAN), or any suitable communication media including, among others.

The authentication server 102 generates a COMMON-SEED and sends the encrypted COMMON-SEED to the peer 104. The authentication server 102 may store the COMMON-SEED in a memory. When the authentication server 102 also receives a PPK-ID from the peer 104, it retrieves the COMMON-SEED and sends the encrypted COMMON-SEED along with the PPK_ID from the peer to the EAP authenticator 106. The authentication server 102 helps establish a quantum-resistant secure channel between the peer 104 and the EAP authenticator 106 using EAP. In some variations, the authentication server is an EAP server.

The peer 104 may include computers, routers, switches, smartphones, or any other electronic device that might want to establish a secure encrypted connection with the EAP authenticator 106. The peer 104 hosts key distribution and derivation logic 110A, and is in electrical communication with its own session key service (SKS) server 108A. The SKS server 108A may be outside the peer 104. The COMMON-SEED received by the peer 104 from the authentication server is fed into the SKS server 108A of the peer 104. In some variations, the SKS server 108A may be inside the peer. In some variations, the peer is configured to generate PPK and PPK_ID based upon the COMMON-SEED.

The authenticator 106 hosts key distribution and derivation logic 110B and is in electrical communication with its own SKS server 108B. Each of the peer and the EAP authenticator is in electrical communication with its own SKS Server and intends to establish a quantum secure tunnel at the end of EAP authentication. The SKS server 108B may be outside the EAP authenticator 106. The COMMON-SEED and PPK_ID received by the authenticator 106 from the authentication server is also fed into the SKS server 108B of the authenticator 106. In some variations, the SKS server 108B may be inside the EAP authenticator. In some variations, the EAP authenticator is configured to get a PPK corresponding to the PPK_ID from the peer.

Each of the SKS server 108A and SKS server 108B can generate a pair of a PPK key and an associated PPK_ID based upon the COMMON-SEED, which is also referred to as a common seed, common secrete seed or secret seed herein. Given the same secret seed as an input parameter, two SKS implementations can generate the same key and associated ID. The SKS server can be queried for the next key or a specific key ID. The SKS server 108A or 108B uses ratcheting cryptography to generate the next secret seed while forgetting about the previous secret seed. Ratcheting is a technique in cryptography when the encryption key is regularly updating.

In some variations, the peer and the EAP authenticator may be another switch or router, or access point.

In some variations, the peer may be an end client and the EAP authenticator may be a switch.

In some variations, the peer may be any kind of laptop or mobile device and the EAP authenticator may be a remote access server.

In some variations, the peer may be a wireless client and the EAP authenticator may be an access point.

Figure 2:
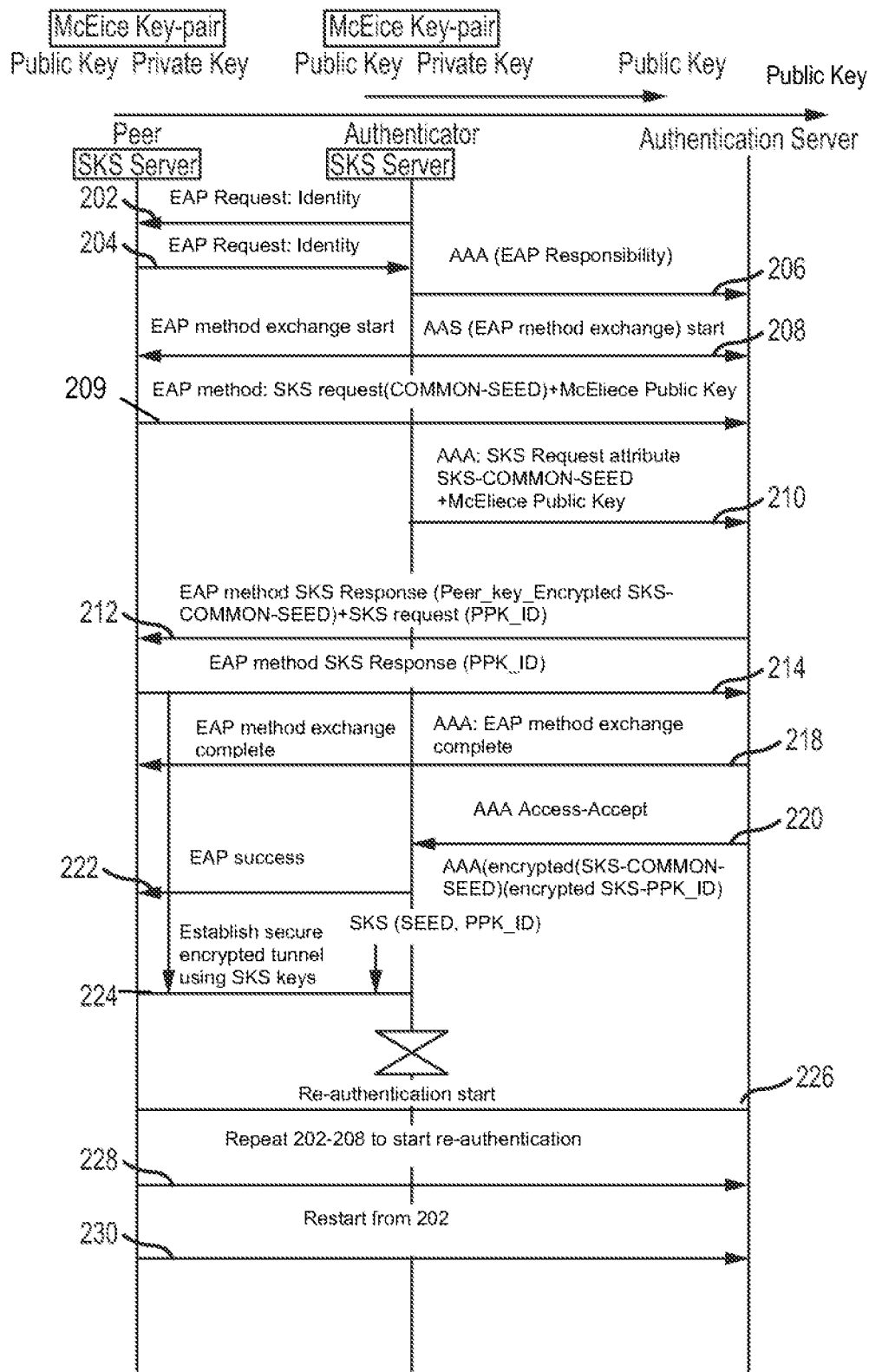
FIG. 2 is a sequence diagram depicting operations to establish a quantum-resistant secure channel using EAP, in accordance with some aspects of the disclosed technology.

FIG. 2 is a sequence diagram depicting operations to establish a quantum-resistant secure channel using EAP, in accordance with some aspects of the disclosed technology. As shown, the sequence diagram shows a typical EAP Message flow when the EAP authenticator 106 is in a pass-through mode.

The sequence includes two main portions, the first portion and the second portion. The first portion relates to how to establish the COMMON-SEED in the peer and the EAP authenticator. The COMMON-SEED is generated by the authentication server and will be used by the peer and the EAP authenticator to fetch the pre-shared key or PPK and the pre-shared key identification or PPK_ID. The second portion relates to how to communicate to establish the same pre-shared key identification or PPK_ID among the peer, the EAP authenticator, and the authentication server, such that the peer and the EAP authenticator have the same pre-shared key or PPK. When the peer needs to communicate with the authenticator, the peer will request a pre-shared key based upon the COMMON-SEED.

As shown in FIG. 2, initial operations 202, 204, and 206 perform a basic EAP exchange. Specifically, at operation 202, the authenticator 106 sends a request for peer identity to the peer 104. At operation 204, the peer 104 passes its identity or the peer identity to the authenticator 106. Then, at operation 206, the authenticator 106 passes the peer identity to the authentication server 102 or EAP server using authentication, authorization, and accounting (AAA) based transport.

At 208, EAP method exchanges start. The EAP method (e.g. EAP-XXX method) exchanges start message where an actual EAP-XXX authentication starts. There are multiple EAP method exchanges in operations 209, 210, 212, and 214 as described below.

Operation 209 introduces a new EAP SKS-specific message, where the peer 104 sends an SKS request to the authentication server 102 for the COMMON-SEED using the EAP method. The peer 104 also sends its own McEliece public key to the authentication server 102 using the EAP method, which helps avoid configuration of the public key on the authentication server 102 for the peer 104 and provides a huge operational advantage.

For example, EAP-FAST can have new TLVs like TLV-COMMON-SEED_REQ. The peer 104 can send the TLVs with null data in EAP-FAST exchange to hint the authentication server 102 to deliver actual data. Then, the authentication server 102 sends the actual data into the TLVs at the end of successful authentication.

As another example, EAP-FAST can also have new TLVs like TLV-SKS-MCELIECE_PUBKE. The peer 104 can send the TLVs with its own McEliece public key to the authentication server 102. Then, the authentication server 102 sends the actual data into the TLVs at the end of successful authentication.

At operation 210, the EAP authenticator 106 sends a AAA attribute COMMON-SEED (similar to rfc7268) using the EAP method (e.g. EAP-XXX method) to hint the authentication server 102 to send COMMON-SEED at the end of successful authentication. The EAP authenticator 104 also passes its own McEliece public key to the authentication server 102 using the EAP method, which helps avoid configuration of public key on the authentication server 102 for the EAP authenticator 106, and provides a huge operational advantage.

For example, RADIUS attributes (rfc7268) can be extended to have Attribute EAP-COMMON-SEED. The EAP authenticator 104 sends the attribute in AAA ACCESS-REQUEST with null data to the authentication server 102, which delivers actual data at the end of successful authentication.

RADIUS attributes (rfc7268) can also be extended to have Attribute EAP-MCELIECE_PUBKEY. The EAP authenticator 106 sends this attribute in AAA ACCESS-REQUEST with its own McEliece public key to the authentication server 102.

At operation 212, the authentication server 102 sends a SKS response including the peer's public key encrypted COMMON-SEED along with a SKS request for the PPK-ID to the peer 104 using the EAP method. The authentication server 102 sends EAP-XXX method SKS specific packet to the peer 104 and delivers the COMMON-SEED, which is encrypted using the peer's McEliece's public key. Now, the peer 104 is successfully authenticated at the authentication server 102.

At operation 214, the peer 104 then initializes its own SKS server 108A on its device and can retrieve a key pair in the form of (key-id, key) or (PPK_ID, PPK). The peer 104 then sends the PPK_ID to the authentication server 102 using the EAP method with SKS specific exchange. The EAP-XXX method completes the authentication process.

At 218, the EAP method exchanges complete. The EAP method exchanges start at 208, through operations 209, 210, 212, and 214, and end at 218. The exchanges for the requests for the COMMON-SEED from the peer and the EAP authenticator to the authentication server, the delivery of the COMMON-SEED to the peer from the authentication server, the request for the PPK_ID from the authentication server to the peer, and the delivery of the PPK_ID from the peer to the authentication server are all performed using the EAP method.

At operation 220, the authentication server 102 sends AAA attributes to share the same COMMON-SEED and PPK_ID to the authenticator 106 (i.e. radius attributes rfc7268) along with ACCESS-ACCEPT. The PPK-ID is also referred to as an SKS-PPK_ID. Note that both or at least COMMON-SEED attribute is encrypted using the authenticator's McEliece public key. The authenticator 106 receives the COMMON-SEED and can initialize its SKS server 108B. The authenticator 106 also receives the PPK-ID from the authentication server 102 and can fetch the corresponding PPK corresponding to the PPK-ID from the SKS server 108B. The authenticator 106 now can have an encrypted communication channel to the peer 104.

At 222, a message of the EAP success is delivered from the authenticator 106 to the peer 104, which ends the EAP-XXX authentication process. At 224, the peer 104 and the authenticator 106 can now establish a secure tunnel between them using SKS keys (e.g. IPSEc, or MACSec). The peer and the authenticator can fetch keys from SKS servers using PPK_ID or generate new session keys by adding SKS pre-shared key using an exiting EAP MSK derivation technique. For example, rfc5216, EAP-TLS, derives MSK in this way and can be extended to use:

Key_Material=TLS-PRF-128 (master secret, "client EAP encryption", client.random∥server.random), MSK=Key_Material(0,63)|SKS Key/PPK, or MSK=SKS key/PPK, EMSK=Key_Material (64,127).

At 226, EAP-Re-authentication starts. In the EAP re-authentication, the peer 104 or the authenticator 106 can use a flag (e.g. force a new COMMON-SEED) to indicate to the authentication server 102 to generate a new COMMON-SEED. For example, the peer 104 or the authenticator 106 can request to "force a new COMMON-SEED" by passing a flag of "force a new SEED" in the request packet. The authentication server 102 then provides the new COMMON-SEED to the peer 104 and authenticator 106.

The authentication server 102 may deliver the last generated COMMON-SEED to the peer 104 such that the peer knows that the COMMON-SEED is already installed and the peer avoids re-initializing the SKS server 108A and only fetches the new PPK-ID.

At 228, operations 202 to 208 can be repeated to start re-authentication. The EAP-Re-authentication uses RFC 6696 for re-authentication or RFC 3748-FAST-Reconnect feature. During the EAP re-authentication, the peer 104 can get re-authenticated. A new PPK_ID can be generated by the peer 104 and shared with the authentication server 102 (as described in operation 214) and to the authenticator 106 (as mentioned in operation 220). In the EAP re-authentication, there is no need to refresh COMMON-SEED every time.

The authentication server 102 can return the same COMMON-SEED to the peer 104 and the authenticator 106 in re-authentication. Both the peer 104 and the authenticator 106 are aware of the COMMON-SEED and can recover the COMMON-SEED when the peer 104 or the authenticator 106 reboots by retrieving the COMMON-SEED from the authentication server 102.

At 230, the method can repeat to restart from operation 202 and continues to operation 228.

In some variations, the COMMON-SEED includes SKS-COMMON SEED. In some variations, the PPK_ID includes SKS-PPK_ID.

In some variations, the format of COMMON-SEED and PPK_ID may vary with the distribution method.

Figure 3:
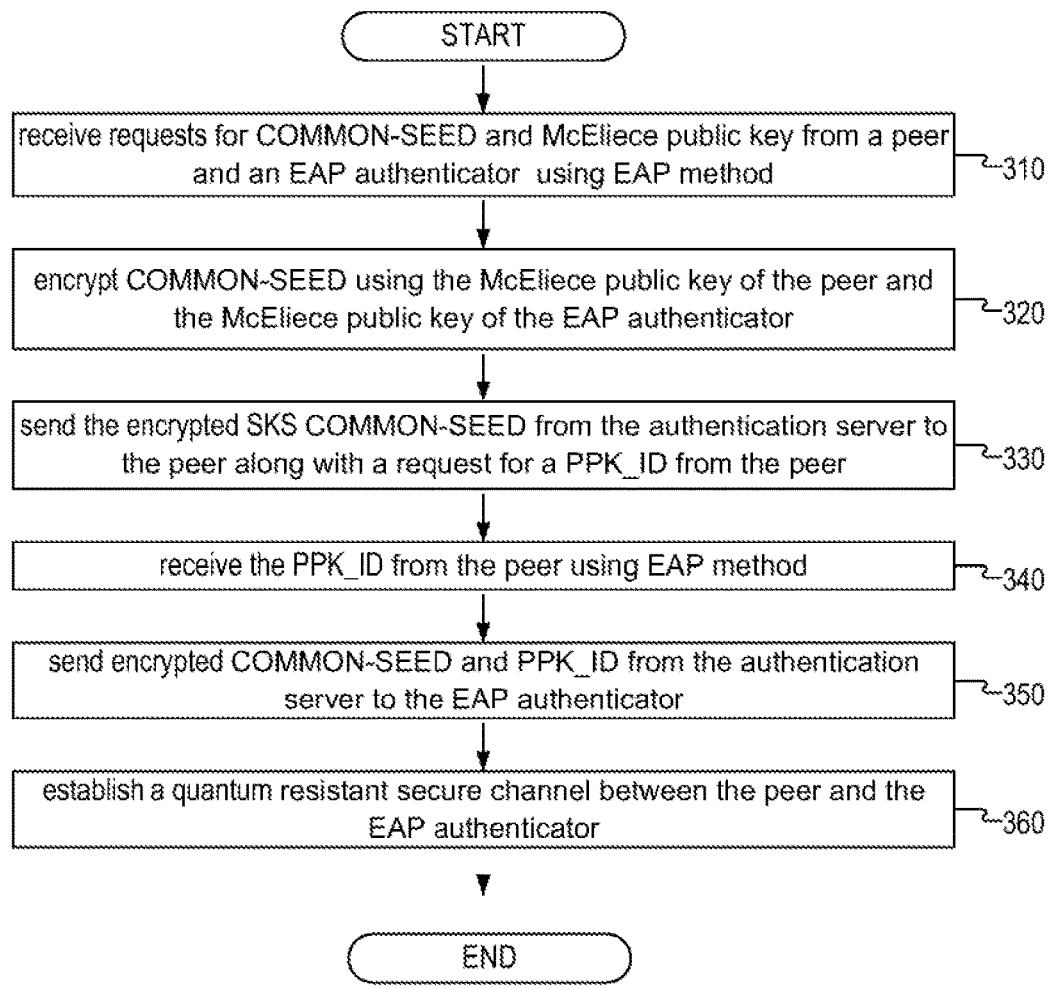
FIG. 3 is an example flow chart for establishing a quantum-resistant secure channel between a peer and an EAP authenticator, in accordance with some aspects of the disclosed technology.

FIG. 3 is an example flow chart for establishing a quantum-resistant secure channel between the peer and the EAP authenticator, in accordance with some aspects of the disclosed technology. Although an example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the present technology may include exchanging a peer identity among a peer, an EAP authenticator, and an authentication server. For example, the EAP authenticator 106 may send an EAP request for peer identity to the peer 104. The peer 104 is in electrical communication with an SKS server 108A and gets the peer identity from the SKS server 108A and sends its identity to the EAP authenticator 106. The EAP authenticator 106 may pass the peer identity to the authentication server 102 using AAA based transport.

According to some examples, the present technology includes receiving requests for a COMMON-SEED and McEliece public key from a peer and an EAP authenticator by an authentication server using an EAP method at block 310. For example, the authentication server 102 illustrated in FIG. 1 may receive requests for COMMON-SEED and McEliece public key from the peer 104 and the EAP authenticator 106. The present technology may include receiving an SKS request for a COMMON-SEED and the first McEliece public key of the peer at the authentication server and receiving an SKS request attribute for the COMMON-SEED and the second McEliece public key of the EAP authenticator at the authentication server using an EAP method.

According to some examples, the present technology includes encrypting the COMMON-SEED using the McEliece public key of the peer and the McEliece public key of the EAP authenticator by the authentication server at block 320. For example, the authentication server 102 may encrypt the COMMON-SEED using the McEliece public key of the peer 104 and the McEliece public key of the EAP authenticator 106.

In some variations, the COMMON-SEED is generated by the authentication server.

In some variations, the COMMON-SEED is encrypted using the McEliece public key of the peer or receiver when being transported using EAP.

According to some examples, the present technology includes sending the encrypted COMMON-SEED from the authentication server to the peer along with a request for a PPK from the peer to complete authentication of the peer at block 330. For example, the authentication server 102 may send the encrypted COMMON-SEED to the peer 104 along with a request for a PPK_ID from the peer.

According to some examples, the present technology includes receiving the PPK_ID from the peer using the EAP method at block 340. For example, the authentication server 102 may receive the PPK_ID from the peer 104 using the EAP method. The PPK_ID is from a key pair consisting of PPK_ID and PPK obtained from the first SKS server 108A in electrical communication with the peer 104 based upon the encrypted COMMON-SEED. The peer 104 can decrypt the encrypted COMMON-SEED using its McEliece private key, which is quantum secure.

According to some examples, the present technology includes sending the encrypted COMMON-SEED and PPK_ID from the authentication server to the EAP authenticator, such that the peer and the EAP authenticator share the same COMMON-SEED and the same PPK-ID at block 350. For example, the authentication server 102 may send the encrypted COMMON-SEED and PPK_ID to the EAP authenticator 106, such that the peer 104 and the EAP authenticator 106 share the same COMMON-SEED and the same PPK-ID. The EAP authenticator 106 can decrypt the encrypted COMMON-SEED using its McEliece private key and PPK_ID, which is quantum secure.

In some variations, the distribution of the COMMON-SEED and PPK_ID may use the hardware for encrypting and decrypting at all the end points, including the authentication server, the peer, and the EAP authenticator, such that the distribution provides the quantum secure channels. The encrypting can only be done by using the hardware of the authentication server 102 with the public key of the peer or the EAP authenticator. The decrypting cannot be done without the private key of the receiver, such as the peer or EAP authenticator. The decrypting can only be done by using the hardware of the peer or the hardware of the EAP authenticator with the private key. The private keys always stay with the hardware of the receiver and never leave the hardware of the receiver.

The EAP authenticator 106 may receive a request for a PPK corresponding to a first PPK_ID. The EAP authenticator 106 can also get the PPK corresponding to the PPK_ID from the SKS server 108B, such that the EAP authenticator 106 has the same pre-shared key or PPK as the peer 104. The PPK_ID is a number and serves the purpose of synchronization. For example, a first PPK_ID has an identity—No. 1. For some reason, the communication may be broken. The EAP authenticator 106 cannot get the PPK corresponding to the first PPK_ID. When the communication is restored, the EAP authenticator 106 may receive a second request for a PPK corresponding to a second PPK_ID (e.g. identity—No. 2). The EAP authenticator 106 can get the PPK corresponding to the identity—No. 2, which is used to fetch the PPK rather than the PPK corresponding to identity—No. 1.

According to some examples, the present technology includes establishing a quantum-resistant secure channel between the peer and the EAP authenticator at block 360. For example, a message of EAP success is delivered from the EAP authenticator to the peer when the peer and the EAP authenticator share the same COMMON-SEED and the same PPK-ID. The authentication server 102 helps establish a quantum-resistant secure channel between the peer and the EAP authenticator. Because the authentication server 102 sends the COMMON-SEED in an encrypted form using the receiver's McEliece public-key (e.g. the receiver can be the peer 104 or the EAP authenticator 106), only the specific endpoint (e.g. the peer or the EAP authenticator can decrypt the encrypted COMMON-SEED using the private key of the endpoint, which thus provides a quantum secure channel for transport of communications.

In some variations, the PPK_ID is encrypted using the McEliece public key of the EAP authenticator by the authentication server.

In some variations, the COMMON-SEED and the PPK_ID are decrypted using the EAP authenticator's McEliece private key by the EAP authenticator, wherein the McEliece private key is part of a pair consisting of McEliece private key and McEliece public key for the EAP authenticator.

In some variations, the COMMON-SEED is decrypted using the peer's McEliece private key by the peer, wherein the McEliece private key is part of a pair consisting of McEliece private key and McEliece public key for the peer.

In some variations, at least the COMMON-SEED attribute is encrypted using the McEliece public key of the EAP authenticator by the authentication.

The present technology may also include generating a new PPK key by adding an SKS pre-shared key with an EAP MSK derivation technique.

The present technology may also include re-authenticating the peer, including generating a new PPK_ID by the first SKS server in electrical communication to the peer, sharing the new PPK_ID from the peer with the EAP authenticator through the authentication server, and retrieving the COMMON-SEED from the authentication server by the peer and the EAP authenticator by using the new PPK_ID.

The re-authentication may also include receiving a flag for generating a new COMMON-SEED from the peer or the EAP authenticator at the authentication server; and generating a new COMMON-SEED by the authentication server.

The present technology may also include refreshing COMMON-SEED by driving refresh from the authentication server.

The disclosed method provides additional benefits. As IEEE 802.1x/EAP is a widely used technology, EAP keys are used to encrypt communication channels between Point-Point machines. SKS would provide quantum-safe communication. Also, as EAP is used on point-to-point protocol (PPP) along with IEEE 802.1x, IEEE 802.5 token ring, IEEE 802.11 Wireless, integrating SKS solution and pre-shared key distribution with EAP can cover many deployment scenarios.

In some variations, EAP is used in IPSec/IKEv2-EAP. IPSec encryption keys can also be derived or distributed using the IKEv2-EAP variant. Also, EAP is supported in VPN deployment for L2/L3 VPN authentication type.

In some variations, apart from a Packet network, EAP is supported in 3GPP standards for GSM (EAP-SIM), Internet-of-Things (EAP-NOOB). EAP can cover many domains and deployment scenarios.

In some variations, many network applications, such as routing protocols (like OSPF, BGP, ISIS), MPLS/RSVP, IP Security (IPsec)/Internet Key Exchange (IKE), Media Access Control Security (MACsec)/MACsec Key Agreement (MKA), use pre-shared keys for authentication or traffic key derivations.

In some variations, IPSec encryption keys are derived and distributed using IKEv2-EAP variant when the EXP is used in IPSec/IKEv2-EAP.

Figure 4:
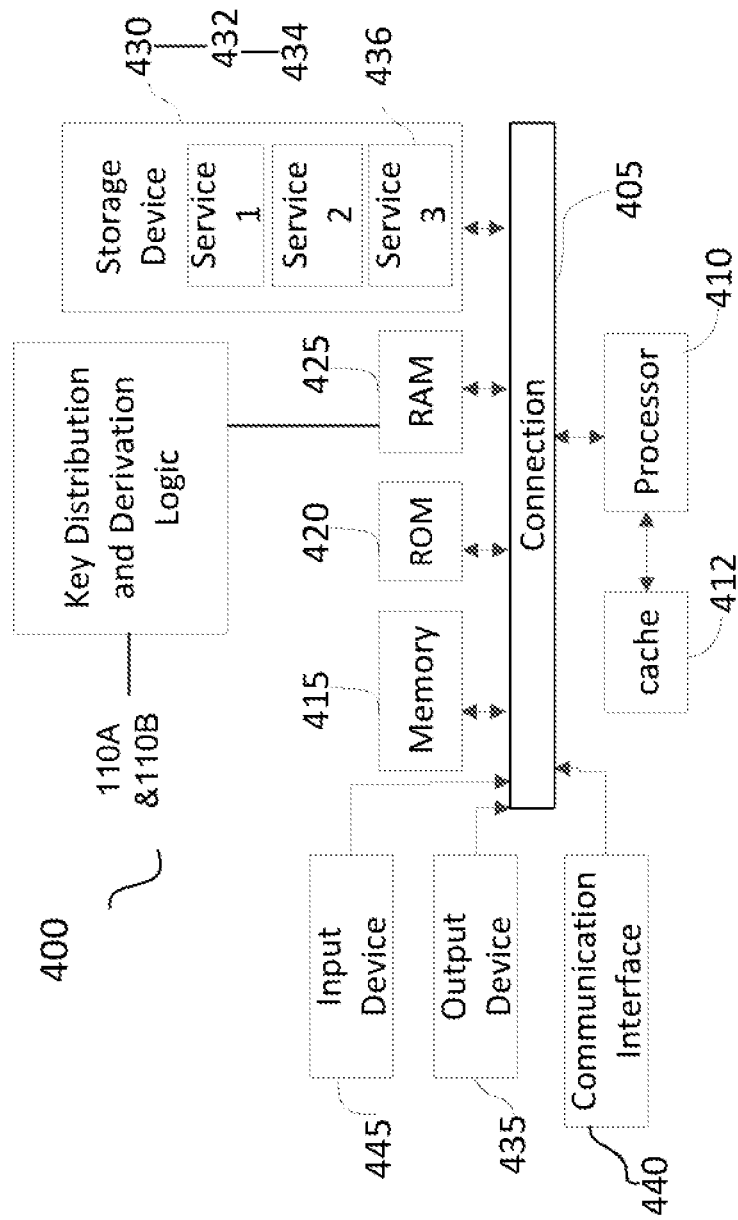
FIG. 4 shows an example device that executes key distribution and derivation logic, in accordance with some aspects of the disclosed technology.

FIG. 4 shows an example device (e.g. peer or EAP authenticator) that executes key distribution and derivation logic 110A-B. It should be appreciated that FIG. 4 provides only an illustration of one embodiment and does not imply any limitations with regard to the environments in which different embodiments may be implemented. Many modifications to the depicted environment may be made. Indeed, in many implementations of a device configured to host key distribution and derivation logic 110A-B, much of the hardware described below may not be needed.

Device 400, which can be for example any computing device making up internal computing system, or remote computing system of the authentication server 102, the peer 104, or the EAP authenticator 106, (potential) passenger device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, device 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Device 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, device 400 includes an input device 445, which can represent any number of input mechanisms, such as a microphone for speech, a touch-sensitive screen for gesture or graphical input, keyboard, mouse, motion input, speech, etc. Device 400 can also include output device 435, which can be one or more of a number of output mechanisms known to those of skill in the art. In some instances, multimodal systems can enable a user to provide multiple types of input/output to communicate with device 400. Device 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

EXAMPLES

The following examples are for illustration purposes only. It will be apparent to those skilled in the art that many modifications, both to materials and methods, may be practiced without departing from the scope of the disclosure.

There may be thousands of remote access lines or EAP authenticators and thousands of mobile devices or peers. The authentication server may be hosted on a general purpose computer. The generation of COMMON-SEED is offloaded to the authentication server, which provides the central control for rekeying or refreshing all the receivers including all peers and all EAP authenticators.

Figure 5:
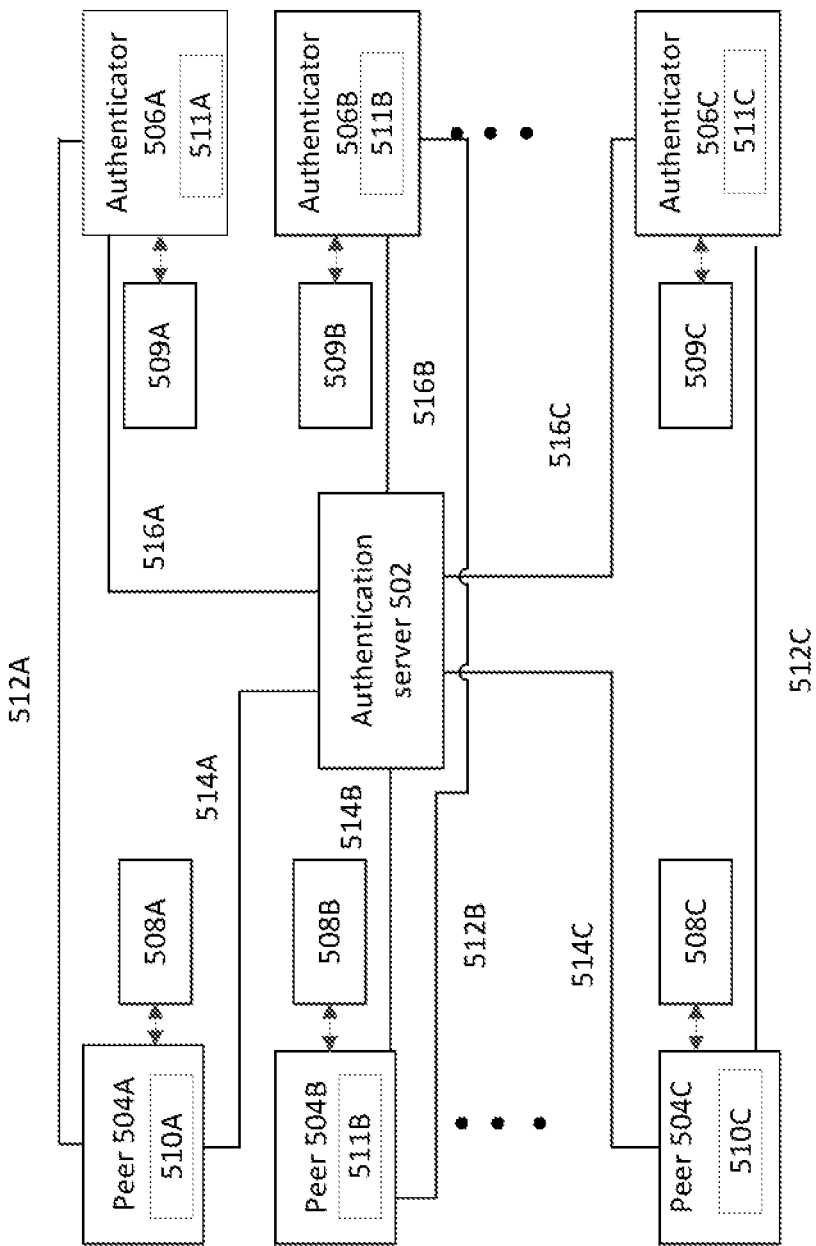
FIG. 5 is an example system diagram with multiple peers and multiple EAP authenticators and an authentication server, in accordance with some aspects of the disclosed technology.

FIG. 5 is an example system diagram with multiple peers and multiple EAP authenticators and an authentication server, in accordance with some aspects of the disclosed technology. As shown, a number of networks or connections 514A-C, such as a public network or wide area network (WAN), interconnect a number of a peer 504A-C with an authentication server 502. The peers are a user, client, or supplicant that want to be authenticated. The authentication server 502 does the authentication. A number of EAP authenticators 506A-C is a device between the peers 504A-C and the authentication server 502, such as a wireless access point. As shown, the peers 504A-C are in quantum secure communication with the EAP authenticators 506A-C through network or connections 512A-C. The authentication server 102 is also in quantum secure communication with the EAP authenticators 506A-C through network or connection 516A-C. The network or connections 512A-C, 514A-C, and 516A-C may include a WiFi network, a cellular network, a satellite network, a wide area network (WAN), a public network, local area network (LAN), or any suitable communication media including, among others.

The authentication server 502 generates COMMON-SEED and sends encrypted COMMON-SEED to the peers 504. The authentication server 502 may store the COMMON-SEED in a memory. When the authentication server 502 can also receive PPK-IDs from the peers 504A-C, it can retrieve the COMMON-SEED and sends encrypted COMMON-SEED along with PPK_ID from the peers 504A-C to the corresponding EAP authenticators 506A-C. The authentication server 502 helps establish a quantum-resistant secure channel between the peers 504A-C and the EAP authenticators 506A-C using EAP. In some variations, the authentication server is an EAP server.

The peers 504A-C may include computers, routers, switches, smartphones, or any other electronic device that might want to establish a secure encrypted connection with the EAP authenticators 506A-C. The peers 504A-C host key distribution and derivation logic 510A-C, and are in electrical communication with their own session key service (SKS) servers 508A-C. The SKS servers 508A-C may be outside the peer 504A-C. The COMMON-SEEDs received by the peers 504A-C from the authentication server are fed into the corresponding SKS servers 508A-C of the peer 104. In some variations, the SKS servers 508A-C may be inside the corresponding peers 504A-C. In some variations, the peers are configured to generate PPK and PPK_ID based upon the COMMON-SEED.

The authenticators 506A-C host key distribution and derivation logic 511A-C and are in electrical communication with their own SKS servers 509A-C. Each of the peer and the EAP authenticator is in electrical communication with its own SKS Server and intends to establish a quantum secure tunnel at the end of EAP authentication. The SKS servers 509A-C may be outside the EAP authenticators 506A-C. The COMMON-SEEDs and PPK IDs received by the corresponding authenticators 506A-C from the authentication server are also fed into the respective SKS servers 509A-C of the authenticators 506A-C. In some variations, the SKS servers 509A-C may be inside the respective EAP authenticators 506A-C. In some variations, the EAP authenticators are configured to get a PPK corresponding to the PPK IDs from the peers. It will be appreciated by those skilled in the art that the number of peers or EAP authenticator may vary.

In some variations, the EAP authenticator may be a switch, a router, or a wireless access point. For example, the peer may be an end client, while the EAP authenticator may be a switch. The peer may be any kind of laptop or mobile device, while the EAP authenticator may be a remote access server. The peer may be a wireless client, while the EAP authenticator may be a wireless access point.

Figure 6:
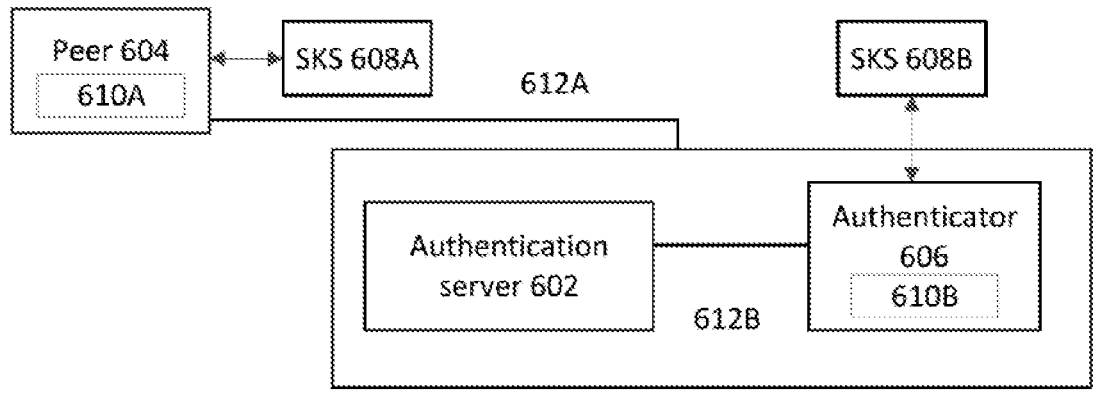
FIG. 6 is an example system diagram with an authentication server and an EAP authenticator on a same machine, in accordance with some aspects of the disclosed technology.

In some variations, the EAP authenticator 106 and the authentication server 102 may reside on the same machine. FIG. 6 is an example system diagram with an authentication server and an EAP authenticator on the same machine, in accordance with some aspects of the disclosed technology. As shown, an authentication server 602 and an EAP authenticator 106 reside on the same machine 614 and are in electrical communication through connection 612B, which interconnects with a peer 604 through network or connection 612A. The network or connection 612A or connection 612B may include a WiFi network, a cellular network, a satellite network, a wide area network (WAN), a public network, local area network (LAN), or any suitable communication media including, among others.

The peer 604 is in electrical communication with its own SKS server 608A and hosts key distribution and derivation logic 610A. The authenticator 606 is in electrical communication with its own SKS server 608B and hosts key distribution and derivation logic 610B.

The authentication server or the authenticator may drive refresh when the authenticator and the authentication server are on the same machine.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A method comprising:
receiving requests for a COMMON-SEED and a quantum-safe public key from a peer and an extendible authentication protocol (EAP) authenticator;
encrypting the COMMON-SEED using the quantum-safe public key of the peer and the quantum-safe public key of the EAP authenticator;
sending the encrypted COMMON-SEED to the peer along with a request for a Postquantum Preshared Keys ID (PPKID) from the peer to complete authentication of the peer;
receiving the PPK_ID from the peer, wherein the PPK ID is from a key pair obtained from a first Synchronizing Key Server (SKS) server in electrical communication with the peer based upon the encrypted COMMON-SEED;
sending the encrypted COMMON-SEED and PPK_ID to the EAP authenticator; and
establishing a quantum-resistant secure channel between the peer and the EAP authenticator, wherein a message of EAP success is delivered from the EAP authenticator to the peer when the peer and the EAP authenticator share the same COMMON-SEED and the same PPK-ID.

2. The method of claim 1, further comprising receiving a peer identity from the EAP authenticator through Authentication, Authorization, and Accounting (AAA) based transport, wherein the EAP authenticator sends an EAP request to the peer for the peer identity and receives the peer identity from the peer.

3. The method of claim 1, wherein the COMMON-SEED is generated by an authentication server.

4. The method of claim 1, wherein the COMMON-SEED and the PPK_ID are decrypted using the EAP authenticator's quantum-safe private key by the EAP authenticator, wherein the quantum-safe private key is part of a pair consisting of quantum-safe private key and quantum-safe public key for the EAP authenticator.

5. The method of claim 1, wherein the COMMON-SEED is decrypted using the peer's quantum-safe private key by the peer, wherein the quantum-safe private key is part of a pair consisting of quantum-safe private key and quantum-safe public key for the peer.

6. The method of claim 1, further comprising generating new session key by adding SKS pre-shared key with an EAP Master Session Key (MSK) derivation technique.

7. The method of claim 1, further comprising re-authenticating the peer and the EAP authenticator.

8. The method of claim 7, wherein the re-authenticating the peer and the EAP authenticator comprises: receiving a new PPK_ID from the peer, wherein the new PPKID is generated by the first SKS server in electrical communication to the peer; retrieving the COMMON-SEED by using the new PPKID; sending the COMMON-SEED and the new PPKID to the EAP authenticator; and sending the COMMON-SEED to the peer.

9. The method of claim 8, wherein the re-authenticating the peer and the EAP authenticator comprises:
receiving a flag of generating a new COMMON-SEED from the peer or the EAP authenticator; and
generating a new COMMON-SEED.

10. The method of claim 1, further comprising refreshing COMMON-SEED by driving a refresh.

11. The method of claim 1, wherein the peer is one of a user, a client, or supplicant.

12. The method of claim 1, wherein the EAP authenticator comprises one of a wireless access point, a switch, a router, or a remote access server.

13. The method of claim 1, wherein the peer is configured to generate a PPK and PPK ID based upon the COMMON-SEED.

14. The method of claim 1, wherein the EAP authenticator is configured to get a PPK corresponding to the PPK_ID from the peer.

15. A system comprising:
one or more processors;
a non-transitory computer readable medium comprising instructions stored therein, the instructions, when executed by the one or more processors, cause the processors perform operations comprising:
receiving requests for a COMMON-SEED and a quantum-safe public key from a peer and an extendible authentication protocol (EAP) authenticator;
encrypting the COMMON-SEED using the quantum-safe public key of the peer and the quantum-safe public key of the EAP authenticator;
sending the encrypted COMMON-SEED to the peer along with a request for a Postquantum Preshared Keys ID (PPKID) from the peer to complete authentication of the peer;
receiving the PPK_ID from the peer, wherein the PPK ID is from a key pair obtained from a first Synchronizing Key Server (SKS) server in electrical communication with the peer based upon the encrypted COMMON-SEED;
sending the encrypted COMMON-SEED and PPK_ID to the EAP authenticator;
and establishing a quantum-resistant secure channel between the peer and the EAP authenticator, wherein a message of EAP success is delivered from the EAP authenticator to the peer when the peer and the EAP authenticator share the same COMMON-SEED and the same PPK-ID.

16. The system of claim 15, wherein the COMMON-SEED is generated by an authentication server.

17. The system of claim 16, wherein the COMMON-SEED and the PPK_ID are decrypted using the EAP authenticator's quantum-safe private key by the EAP authenticator, wherein the quantum-safe private key is part of a pair consisting of quantum-safe private key and quantum-safe public key for the EAP authenticator.

18. A non-transitory computer readable medium comprising instructions, the instructions, when executed by a computing system, cause the computing system to perform operations comprising:
receiving requests for a COMMON-SEED and a quantum-safe public key from a peer and an extendible authentication protocol (EAP) authenticator;
encrypting the COMMON-SEED using the quantum-safe public key of the peer and the quantum-safe public key of the EAP authenticator;
sending the encrypted COMMON-SEED to the peer along with a request for a Postquantum Preshared Keys ID (PPKID) from the peer to complete authentication of the peer;
receiving the PPK ID from the peer, wherein the PPK ID is from a key pair obtained from a first Synchronizing Key Server (SKS) server in electrical communication with the peer based upon the encrypted COMMON-SEED;
sending the encrypted COMMON-SEED and PPK ID to the EAP authenticator; and
establishing a quantum-resistant secure channel between the peer and the EAP authenticator, wherein a message of EAP success is delivered from the EAP authenticator to the peer when the peer and the EAP authenticator share the same COMMON-SEED and the same PPK-ID.

19. The non-transitory computer readable medium of claim 18, wherein the COMMON-SEED is generated by an authentication server.

20. The non-transitory computer readable medium of claim 19, wherein the COMMON-SEED is generated by an authentication server.

* * * * *